No. 669,528. Patented Mar. 12, 1901.
C. G. HUTCHINSON.
INCLINED ELEVATOR.
(Application filed May 4, 1900.)

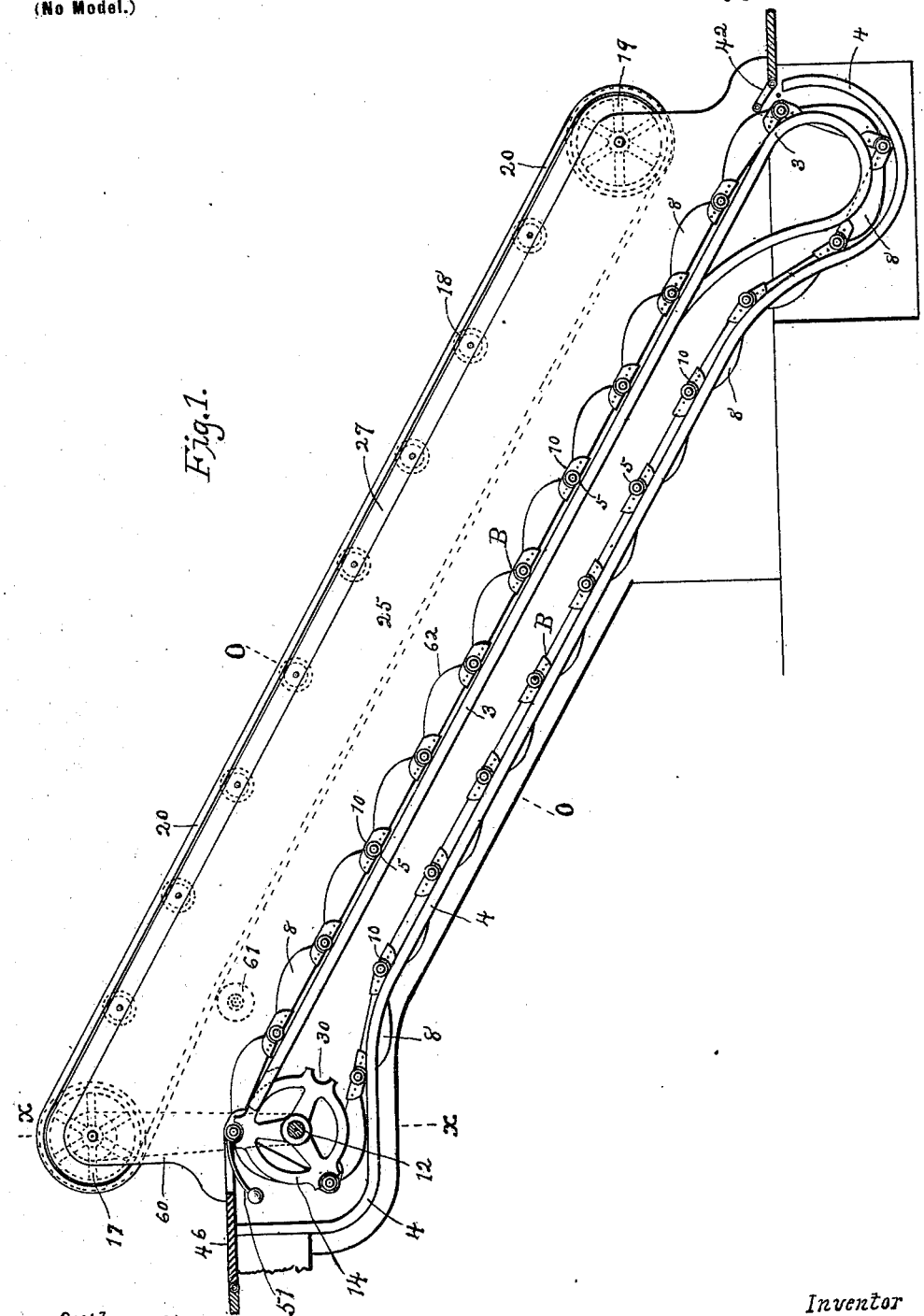

(No Model.) 5 Sheets—Sheet 2.

Witnesses:
William Malestra
Edith Harrington

Inventor:
Charlie G. Hutchinson

No. 669,528. Patented Mar. 12, 1901.
C. G. HUTCHINSON.
INCLINED ELEVATOR.
(Application filed May 4, 1900.)
(No Model.) 5 Sheets—Sheet 3.
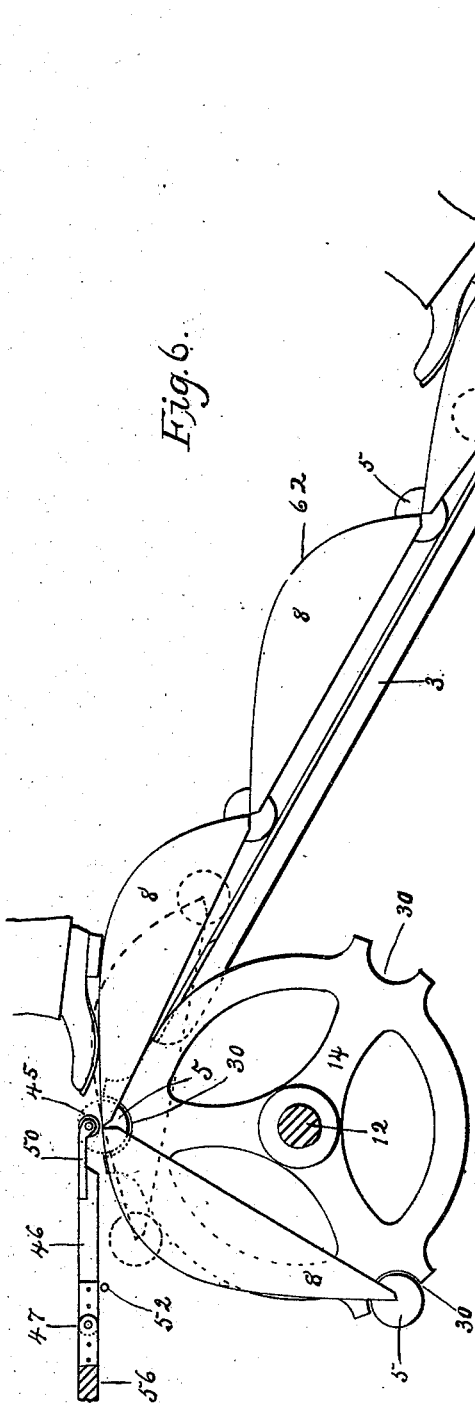
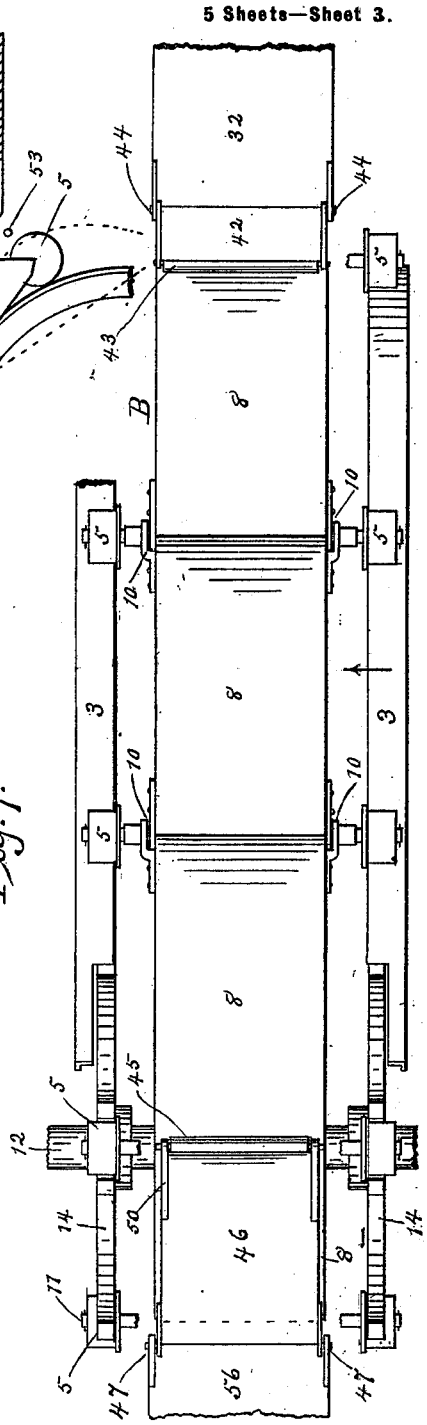
Witnesses.
William Malcolm
Edith Harrington
Inventor.
Charles G. Hutchinson No. 669,528. Patented Mar. 12, 1901.
C. G. HUTCHINSON.
INCLINED ELEVATOR.
(Application filed May 4, 1900.)
(No Model.) 5 Sheets—Sheet 4.
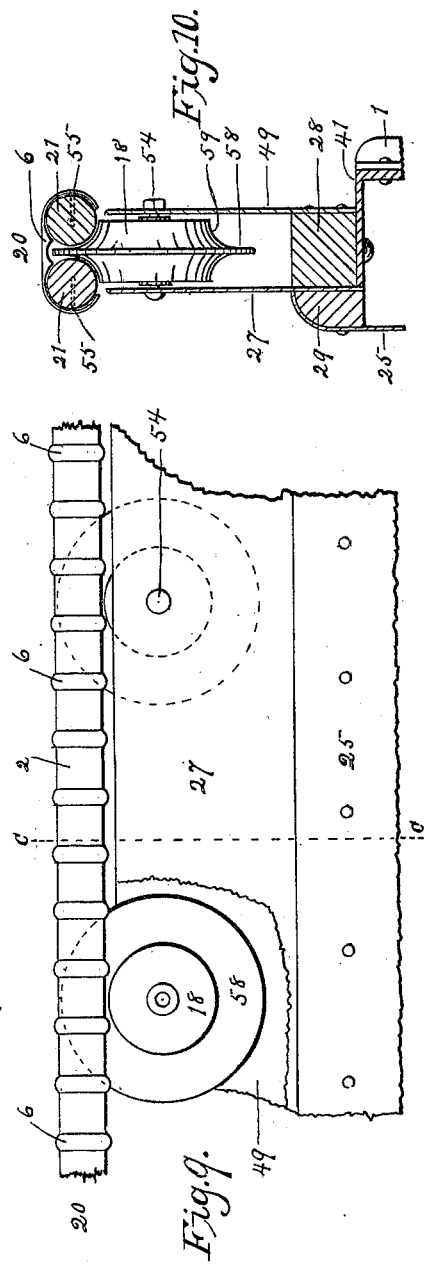
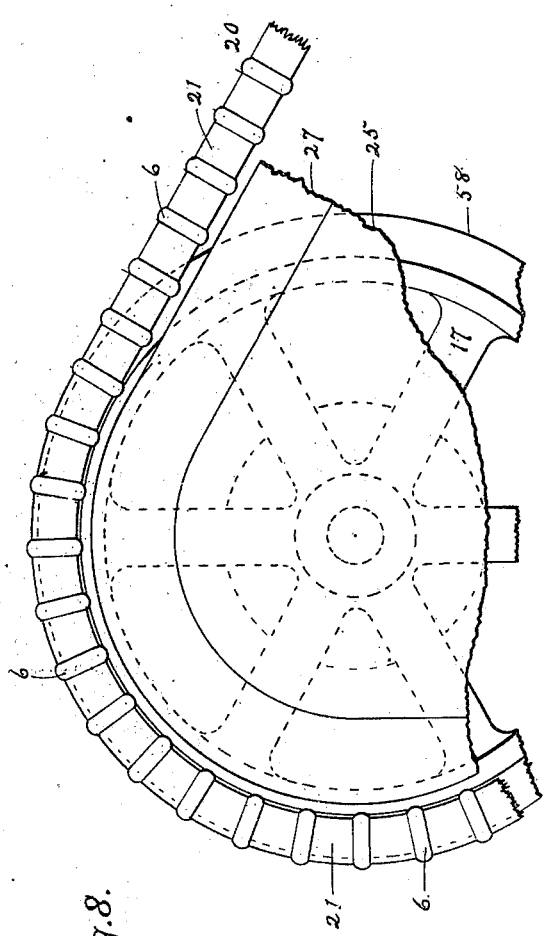
Witnesses:
William Malcolm
Edith Harrington
Inventor:
Charles G. Hutchinson

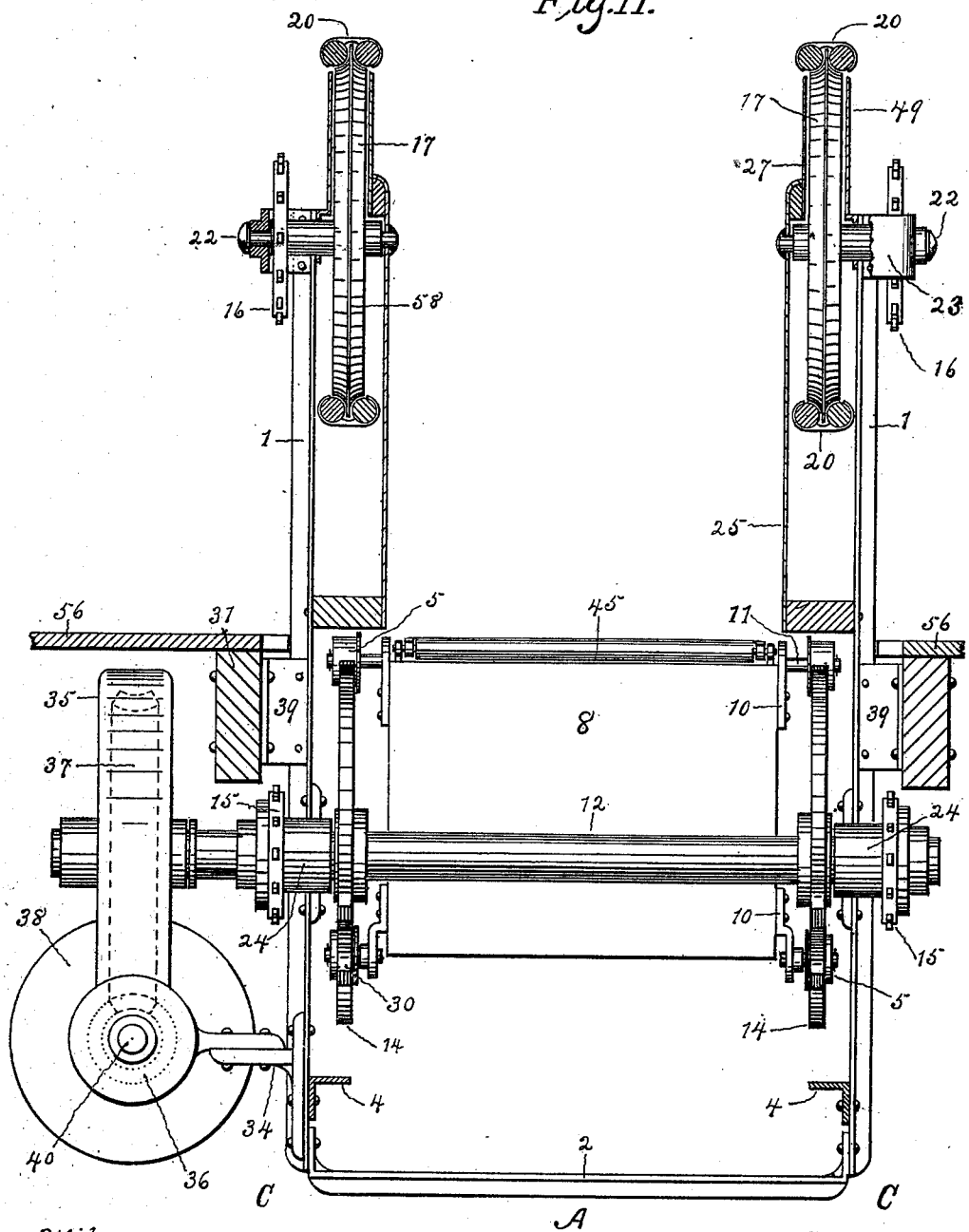

UNITED STATES PATENT OFFICE.

CHARLES G. HUTCHINSON, OF NEW YORK, N. Y.

INCLINED ELEVATOR.

SPECIFICATION forming part of Letters Patent No. 669,528, dated March 12, 1901.

Application filed May 4, 1900. Serial No. 15,467. (No model.)

*To all whom it may concern:*

Be it known that I, CHARLES G. HUTCHINSON, a citizen of the United States, residing in New York city, New York, have invented certain Improvements in Inclined Elevators, of which the following is a specification.

My invention relates to certain improvements in the endless carrier, in the movable hand-rest, in the landings, in the supporting structure, and in the arrangement of motor and gearing. I provide a movable support for the passenger which will present from one landing to another as safe, easy, and convenient a surface for the feet as a stationary stairway and a surface devoid of objectionable angles and openings which might impede the foot or entangle the apparel.

The object of my invention is the production of inclined elevators adapted to the carrying of passengers from one level to another without intermission of simple, safe, and durable construction, which passengers may thoughtlessly enter, conveniently occupy, and automatically land from.

Figure 3:
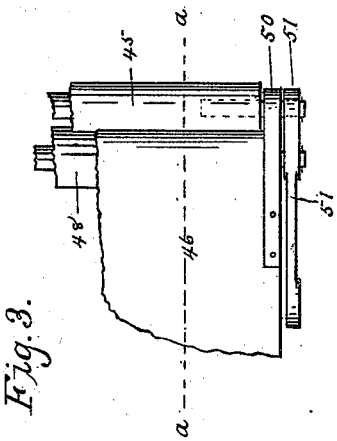
Figure 4:
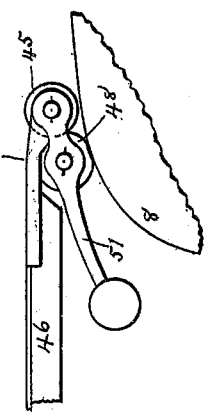
Figure 5:
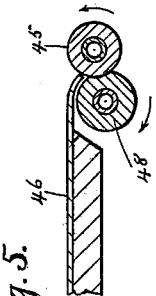
Figure 2:
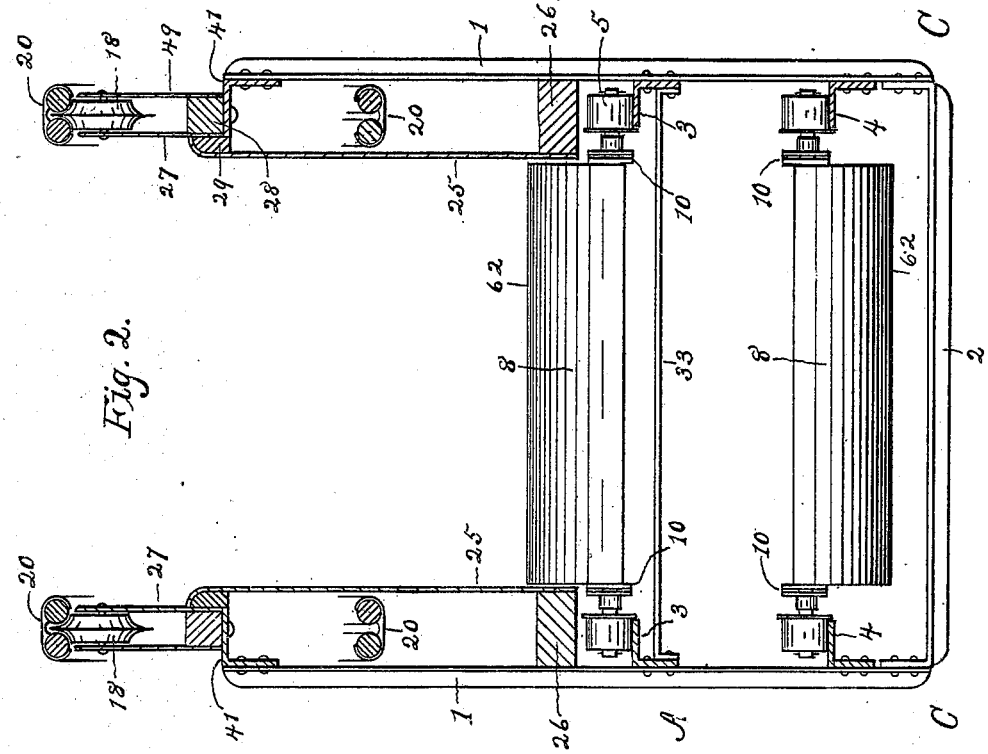

Referring to the accompanying drawings, Figure 1 is a side elevation of my improved inclined elevator as it appears after the removal of the motor, connecting-gearing, and one side of the structure, except the track-rails. Fig. 2 is a sectional view on line O O of Fig. 1. Fig. 3 is a top view of a portion of the upper landing with its accompanying mechanism. Fig. 4 is a side view of part of a step-tread and upper landing. Fig. 5 is a sectional view on the line $a\ a$ of Fig. 3. Fig. 6 is an enlarged elevation of portions of the endless carrier and adjacent parts. Fig. 7 is an enlarged top view of portions of the endless carrier and adjacent parts. Fig. 8 is an enlarged side view of a portion of my movable hand-rest, its driving-wheel, and supporting structure. Fig. 9 is an enlarged side view, partly broken away, of a portion of my movable hand-rest with its supporting idle wheels and structure. Fig. 10 is an enlarged sectional view on line $c\ c$ of Fig. 9. Fig. 11 is an enlarged sectional view on line $x\ x$ of Fig. 1.

*Structure.*—The supporting-frame A consists of side structures C C, each composed of track-rails 3 4 and upper ties 41, secured to a longitudinal series of standards 1. Sides C C are united to form frame A by a longitudinal series of lower ties 2 and intermediate ties 33 secured thereto. This structural frame A is bolted to floor-beams 31 by means of angles 39. Wooden stringers 26, 28, and 29 are for securing sheathing 25, 27, and 49, and also the outer casing, to sides C.

*Endless carrier.*—The inclined endless carrier B is composed of a series of step-treads 8, united by hinges 10 into an endless movable stairway, which is mounted by means of the prolonged hinge-pivots 11 on flanged rollers 5, which engage track-rails 3 and 4 of the structure and gaps 30 of the driving-wheels 14.

The endless carrier B is actuated by the engagement of its supporting-rollers 5 with gaps 30 of the driving-wheels 14.

*Track-rails.*—Track-rails 3 and 4 are formed into a circle at the lower end of their incline, with free space between them for return passage of rollers 5, and by this means the lower return of the movable stairway is effected without complication and expensive results. At the upper terminal track-rails 3 are partly cut away for passage of drive-wheels 14, whereby rollers 5 may become quietly seated in gaps 30 of driving-wheels 14.

*Curved tread-surface.*—The curved tread-surface 62 of steps 8 extends over the entire step from center to center of hinges 10 and has the shape of a circular angle, as hereinafter specified. Said surface may be of rubber or other material and may be long enough between centers of adjacent hinges 10 to easily accommodate a passenger on each step 8.

*Neutral point.*—I have discovered that there is a neutral or common point located above driving-wheels 14 and in same vertical plane as center of said driving-wheels, which may be best utilized for the passenger's exit from the movable stairway, because a desirable curved tread-surface 62 may be constructed, so that as the stairway B is rotated every point in said tread-surface will pass through said neutral point, and I have further discovered that the curved angle which may be thus formed is governed by the following factors with the stated neutral point, the angle of incline for track-rails 3, the distance between centers of adjacent hinges 10, and the diameter of driving-wheels 14, so that with above knowledge a set of factors may be selected which will give almost any desired curved angle for the tread-surfaces of steps 8.

In the accompanying drawings the aforesaid neutral point is shown as being located in a vertical plane passing through center of driving-wheels 14 and at a point where center of hinges 10 pass through said vertical plane as stairway B is rotated. Every point of tread-surfaces 62 between hinges 10 should pass through said neutral point as said stairway is rotated. The contact edge of an exit-landing should be located immediately above said neutral point, but so as not to engage the tread-surfaces 62. With a tread-surface constructed as above specified it is practical to use a platform-landing tapered down to a narrow edge, which edge should be located in close working proximity to said neutral point, but so as not to engage the tread-surfaces 62. If a landing with my improved auxiliary roller-conveyer 45, hereinafter described, is employed, the center of said roller should be located with reference to said neutral point, as hereinafter specified.

I have illustrated in Fig. 6 the average size foot of a passenger as entering upon and leaving the step-treads 8, which with the dotted outlines of other step-treads illustrate how practically the entire surface of the movable stairway is made available as a tread-surface either to enter upon, stand upon, or depart from. The upper foot illustrates the relative position of a foot as it may contact with an ordinary landing or with my improved roller-conveyer 45, the function of said roller 45 being to act as an auxiliary conveyer, lifting the foot and conveying it onto landing 46. Fig. 6 also illustrates by the feet shown how my step-tread surface, with treads ample enough to easily accommodate a passenger on each step, may be made practical to enter upon without waiting to select a particular point to step on, and also how practically a horizontal tread-surface on each step may be selected to stand upon, if desired.

*Driving mechanism.*—The driving mechanism consists of shaft 12, mounted on boxes 24, which are bolted to standards 1, and said shaft carries driving-wheels 14, sprocket-wheels 15, and a Hindley driving worm-gear 37, and said worm-gear engages the worm 36, mounted on motor-shaft 40. Said worm and worm-gear are inclosed in an oil-bath by their supporting-casing 35, which is mounted on bracket or brackets 34 and standards 1 of the structure. Motor 38 is also mounted on said brackets attached to the structure. This method of reducing motion by worm-gearing from motor 38 to driving-shaft 12 is simple, durable, noiseless, and without vibration, while the worm acts as a lock to hold the movable stairway at any point independent of its motor, thus avoiding accidents, and by the method of mounting the motor and reducing gearing on the structure A itself such work may be accomplished at the factory with better results.

*Hand-rail.*—The movable hand-rail 20 is composed of two parallel flexible endless rails 21, of the same length, placed side by side and held by clasps 6, with a narrow free longitudinal space between them. The function of clasps 6—which are placed at intervals longitudinal of the rails 21—is to firmly grasp and hold said rails in their relative position without materially spreading, and so that said rails shall constitute a movable hand-rest 20, agreeable to the grasp of the hand. Clasps 6 are clamped onto rails 21 and more securely held in position by screws 55. Hand-rail 20 engages and is supported by small idle wheels 18, lower end idle wheel 19, and upper driving-wheel 17, and these wheels support the hand-rail free from contact with the stationary parts of the structure, thereby avoiding friction and dispensing with lubricants on the hand-rails. Hand-rail 20 may be composed of ordinary Manila ropes 21 or such ropes refined by an appropriate covering. Clasps 6 may not entirely encircle ropes 21, but may terminate on the outer sides, so as to leave a clear space on the inner and under surfaces of said ropes for contact with driving and idle wheels 17, 18, and 19. Driving-wheel 17 and idle wheels 18 and 19 each have a thin flat central projecting flange 58 and faces 59, shaped to engage the under and inner surfaces of ropes 21 for the purpose of driving, guiding, and properly supporting hand-rail 20. Central flange 58 projects well up into the space between ropes 21 so as to retain hand-rail 20 in position.

Driving-wheel 17 and sprocket-wheel 16 are united by a sleeve and revolubly mounted on fixed studs or pins 22. A spanning support 23, bolted to standards 1, carries outer ends of pins 22, the inner ends of said pins being supported by sheathing 27. Sprocket-wheel 16 and driving-wheel 17 are actuated by sprocket-wheel 15 and connecting-chain 60.

*Landings.*—An auxiliary landing 42, carrying a friction-roller 43, is secured to lower level or landing 32 by hinges 44. Roller 43 rests on and follows the moving tread-surfaces 62 of steps 8. The downward movement of landing 42 is limited by stop-pin 53, the function of said auxiliary landing being to cover the gap between stationary landing 32 and the moving tread-surfaces 62 of steps 8 and also to promote the entrance for passengers to or exit from carrier B. It is hereby understood that my improved inclined elevator may be run to carry passengers up or down, as desired.

Upper floor 56 has an auxiliary landing 46 attached to it by hinges 47. Its downward movement is limited by stop-pin 52, and it carries forward-projecting hangers 50, provided with stud-bearings, on which are mounted an auxiliary rubber conveyer-roller 45 and weighted levers 51. A rubber driving-roller 48 is mounted on levers 51. Landing 46, with its attachments, is held in its normal position by hinges 47 and stop-pin 52, and when in said normal position the center of roller 45 is located in a vertical plane passing through driving-shaft 12, its periphery being kept by adjustable stop-pin 52 from engaging tread-surfaces 62. Roller 48 engages roller 45, has frictional driving-contact with tread-surfaces 62, and is held in driving-contact with said surfaces by the terminal weights of levers 51, so that conveyer-roller 45 is revolved in the direction indicated by arrow in Fig. 5 and at same surface speed as surfaces 62. The upper surface of landing 46 is rounded down and brought into close proximity to conveyer-roller 45.

*Sheathing and casing.*—The inner sides of the elevator passage-way may be sheathed with thin metallic sheets 25, entirely inclosing the framework C C and mechanism from hinges 10 to sheathing 27. Said sheathing 27 incloses the upper space from sheathing 25 to hand-rail 20, but is stopped somewhat short of said hand-rail to prevent contact therewith. Sheathing 27 and 49 prevent contact of the passenger's hand with wheels 17, 18, and 19. Wheels 18 and 19 are journaled on sleeves secured between sheathing 27 and 49 by bolts 54, passing through and supported by said sheathing. An outer casing for the structure may be secured between or over standards 1.

I claim as my invention—

1. In an inclined elevator a movable series of rigid curved supports each presenting substantially a horizontal surface for the support of a person from one landing to another, substantially as shown and described.

2. In an inclined elevator a series of steps having curved treads, said steps being hinged together at their abutting-points, substantially as, and for the purpose specified.

3. In an inclined passenger-elevator an endless movable series of rigid hinged steps having abutting tread-surfaces at center of hinge, substantially as described, and for the purpose specified.

4. In a stair-elevator an endless series of rigid step-sections hinged together at abutting point of tread-surfaces, and wheels on said hinges in combination with track-rails engaging said wheels, substantially as described and for the purpose specified.

5. In a movable stairway rigid steps hinged together at abutting points of their tread-surfaces, in combination with rollers mounted on said hinges, substantially as described.

6. In a stair-elevator steps each having a rigid tread-surface curved to register with under side of landing as they pass said landing.

7. In an inclined elevator an endless series of rigid curved steps, in combination with hinges rigidly secured to same, substantially as described.

8. In an inclined elevator the combination with a landing of a movable support for the person, and a movable auxiliary landing arranged to follow the surface of said movable support.

9. In an inclined elevator the combination of a conveying-support for the person and a movable auxiliary landing.

10. In an inclined elevator the combination of a landing and a rotatable driving-roller arranged to support and drive a passenger onto said landing by direct contact with said roller, substantially as described.

11. In an inclined elevator the combination of a landing and a rotatable driving-roller arranged to drive from said landing onto a movable support by direct contact with said roller, substantially as described.

12. In a device of the character herein specified, a rotatable driving-roller conveyer arranged to drive the foot of a person onto a landing by direct contact with said roller, substantially as described.

13. In a passenger-elevator the combination with a landing of a rotatable driving-roller conveyer arranged to support and drive the foot or apparel of a person onto said landing by direct contact therewith, substantially as described.

14. In a passenger-elevator a rotatable driving-roller conveyer, arranged to support and drive the foot or apparel by direct contact, in combination with means for driving said roller, substantially as described.

15. In an elevator the combination with a landing and an endless movable support for the person, a rotatable driving-roller conveyer over which the person may be driven by direct contact with said roller, and an endless movable hand-rail, said elements being constructed and operating substantially as and for the purpose specified.

16. In an inclined elevator the combination with a landing and an endless movable support for the person, of a movable auxiliary landing, and an endless movable hand-rail, said elements being constructed and operating substantially as and for the purpose specified.

17. In a movable hand-rest, the combination of two endless flexible ropes, with a series of upper spanning clasps secured to said ropes, substantially as described.

18. In a movable hand-rest, the combination of two endless flexible ropes, with a series of upper spanning clasps secured to said ropes so as to leave an under guide-groove longitudinally of the hand-rest, substantially as described.

19. In a movable hand-rest for inclined elevators, the combination of two endless flexible ropes, with a series of upper spanning clasps secured to said ropes so as to leave an under guide-groove adapted to engage a guide on the supporting structure, substantially as described.

20. In a movable hand-rest for inclined elevators, the combination of two endless flexible rails, with a series of upper spanning clasps secured to said rails so as to leave an under groove adapted to engage a guide and a driving-wheel on the supporting structure, substantially as described.

21. In an inclined elevator, the combination of an endless movable hand-rest provided with a longitudinal guide-groove, with a series of rotatable guide-wheels journaled on the elevator structure, intermediate of the upper and lower end hand-rest wheels, and adapted to engage said guide-groove, substantially as described.

22. In an inclined elevator, the combination of an endless movable hand-rest provided with a longitudinal guide-groove, with an upper end wheel and a lower end wheel journaled on the elevator structure and adapted to engage said guide-groove, substantially as described.

23. In an inclined elevator, the combination of an endless movable hand-rest provided with a longitudinal guide-groove, with an upper end wheel, a lower end wheel, and a series of intermediate wheels journaled on the elevator structure and adapted to engage said guide-groove, substantially as described.

24. The combination in the supporting structure of an inclined passenger-elevator, of two side trusses each composed of track-rails and an upper longitudinal tie secured directly to a series of standards, said track-rails being adapted for engagement with an endless carrier, with a series of lower and intermediate cross-ties secured to and uniting said side trusses, substantially as described.

25. In an inclined elevator, the combination with a landing, of an endless carrier having rigid curved steps and pivots arranged to pass substantially through a neutral point located at the entrance to said landing, substantially as and for the purpose specified.

In testimony whereof I have signed my name to this specification in the presence of two subscribing witnesses.

CHARLES G. HUTCHINSON.

Witnesses:
WILLIAM MALCOLM,
EDITH HARRINGTON.